US008581690B2

(12) United States Patent
Lappalainen et al.

(10) Patent No.: US 8,581,690 B2
(45) Date of Patent: Nov. 12, 2013

(54) ELECTROMECHANICAL LOCK

(75) Inventors: Markku Lappalainen, Kempele (FI); Mika Pukari, Oulu (FI); Seppo Lohiniva, Oulu (FI)

(73) Assignee: ILOQ Oy, Oulu (FI)

( * ) Notice: Subject to any disclaimer, the term of this patent is extended or adjusted under 35 U.S.C. 154(b) by 408 days.

(21) Appl. No.: 13/005,635

(22) Filed: Jan. 13, 2011

(65) Prior Publication Data

US 2011/0174029 A1 Jul. 21, 2011

(30) Foreign Application Priority Data

Jan. 15, 2010 (EP) .................................... 10150833

(51) Int. Cl.
*G05B 19/00* (2006.01)

(52) U.S. Cl.
USPC ............. 340/5.1; 340/3.1; 340/3.22; 340/3.9; 340/5.2; 340/5.31; 340/5.51; 340/5.54; 340/5.65; 340/5.67; 340/5.7; 340/5.73; 340/407.2; 340/542; 70/277; 70/278.1; 70/278.2; 70/278.3; 70/278.7; 70/279.1; 70/283.1

(58) Field of Classification Search
USPC ........ 340/5.1, 5.54, 5.64, 5.65, 5.67, 5.7, 3.1, 340/3.22, 3.9, 5.2, 5.31, 5.51, 5.73, 407.2, 340/542; 70/277, 278.1, 278.2, 278.3, 70/278.7, 279.1, 283.1
See application file for complete search history.

(56) References Cited

U.S. PATENT DOCUMENTS 3,848,229 A * 11/1974 Perron et al. .................. 235/382
4,258,352 A * 3/1981 Lipschutz .................... 340/5.72
4,868,559 A * 9/1989 Pinnow ......................... 340/5.67
5,089,692 A * 2/1992 Tonnesson ................. 235/382.5
5,265,452 A * 11/1993 Dawson et al. .............. 70/278.3
5,508,691 A * 4/1996 Castleman et al. .......... 340/5.24
5,540,069 A * 7/1996 Muller et al. ................ 70/278.2
5,552,777 A * 9/1996 Gokcebay et al. ........... 340/5.54
5,628,217 A * 5/1997 Herrera ........................ 70/278.3
5,896,026 A * 4/1999 Higgins ........................ 320/166
5,974,367 A * 10/1999 Bianco ......................... 340/5.21
6,000,609 A * 12/1999 Gokcebay et al. ............ 235/382
6,255,957 B1 * 7/2001 Sonderegger et al. ..... 340/686.1
6,318,137 B1 * 11/2001 Chaum ........................ 70/278.3
6,437,684 B1 * 8/2002 Simeray ....................... 340/5.67
6,483,424 B1 * 11/2002 Bianco .......................... 340/5.6
6,564,600 B1 * 5/2003 Davis .............................. 70/277

(Continued)

FOREIGN PATENT DOCUMENTS

EP 1786998 A1 * 5/2007 .............. E05B 47/06
EP 1808816 A1 * 7/2007 .............. E05B 47/06

(Continued)

*Primary Examiner* — George Bugg
*Assistant Examiner* — Paul Obiniyi
(74) *Attorney, Agent, or Firm* — Birch, Stewart, Kolasch & Birch, LLP

(57) ABSTRACT

An electromechanical lock includes a user interface configured to receive input from a user, the user interface activating operating power for the lock; a memory configured to store access tables, the access tables including information on the keys allowed to open the lock; and an electronic circuitry configured to modify the access tables on the basis of the insertions of an associate master key and an end function key into the lock, the insertion of the associated master key initializing a programming mode and the insertion of an end function key causing the lock to exit the programming mode.

14 Claims, 6 Drawing Sheets

(56) References Cited

U.S. PATENT DOCUMENTS

| | | | | |
|---|---|---|---|---|
| 6,564,601 | B2 * | 5/2003 | Hyatt, Jr. | 70/278.3 |
| 6,826,935 | B2 * | 12/2004 | Gokcebay et al. | 70/278.3 |
| 6,867,685 | B1 * | 3/2005 | Stillwagon | 340/5.64 |
| 7,009,490 | B2 * | 3/2006 | Wong et al. | 340/5.7 |
| 7,316,140 | B2 * | 1/2008 | Russell et al. | 70/278.3 |
| 8,207,817 | B2 * | 6/2012 | Kamiya | 340/5.7 |
| 8,228,030 | B2 * | 7/2012 | Pukari et al. | 320/114 |
| 2001/0028298 | A1 * | 10/2001 | Liden et al. | 340/5.65 |
| 2002/0134120 | A1 * | 9/2002 | Davis | 70/278.3 |
| 2002/0184932 | A1 * | 12/2002 | Davis | 70/278.3 |
| 2002/0189307 | A1 * | 12/2002 | Gokcebay et al. | 70/278.3 |
| 2004/0007032 | A1 * | 1/2004 | Davis | 70/278.3 |
| 2004/0246098 | A1 * | 12/2004 | Denison et al. | 340/5.73 |
| 2009/0085717 | A1 * | 4/2009 | Kirkjan | 340/5.2 |
| 2009/0205384 | A1 * | 8/2009 | Pomerantz | 70/278.3 |
| 2009/0229326 | A1 * | 9/2009 | Pukari et al. | 70/263 |
| 2010/0073129 | A1 * | 3/2010 | Pukari | 340/5.8 |
| 2010/0139343 | A1 * | 6/2010 | Pukari et al. | 70/283.1 |
| 2010/0185331 | A1 * | 7/2010 | Pukari et al. | 700/275 |
| 2010/0188190 | A1 * | 7/2010 | Pukari et al. | 340/5.6 |
| 2010/0217972 | A1 * | 8/2010 | Lohiniva et al. | 713/153 |
| 2011/0174029 | A1 * | 7/2011 | Lappalainen et al. | 70/279.1 |
| 2012/0111072 | A1 * | 5/2012 | Pukari et al. | 70/279.1 |

FOREIGN PATENT DOCUMENTS

| | | | | | |
|---|---|---|---|---|---|
| EP | 2017412 | A1 * | 1/2009 | | E05B 47/00 |
| EP | 2017413 | A1 * | 1/2009 | | E05B 47/06 |
| EP | 2017794 | A1 * | 1/2009 | | G07C 9/00 |
| EP | 2043055 | A1 * | 4/2009 | | G07C 9/00 |
| EP | 2157552 | A1 * | 2/2010 | | G07C 9/00 |
| JP | 2010048081 | A * | 3/2010 | | |
| WO | WO 9602721 | A1 * | 2/1996 | | E05B 47/06 |
| WO | WO 9918310 | A1 * | 4/1999 | | E05B 47/06 |
| WO | WO 01/44606 | A1 | 6/2001 | | |
| WO | WO 2006008340 | A1 * | 1/2006 | | E05B 47/00 |
| WO | WO 2007068794 | A1 * | 6/2007 | | G07C 9/00 |

* cited by examiner

ELECTROMECHANICAL LOCK

FIELD

The invention relates to electromechanical locks. The invention relates especially to programming of electromechanical locks.

BACKGROUND

Various types of electromechanical locks are replacing traditional mechanical locks. Electromechanical locks require an external supply of electric power, a battery inside the lock, a battery inside the key, or means for generating electric power within the lock making the lock user-powered. Electromechanical locks provide many benefits over traditional locks. They provide better security, and the control of keys or security tokens is easier.

In addition, most electromechanical locks and/or keys and tokens are programmable. It is possible to program the lock to accept different keys and decline others.

There are many programmable locking systems where special programming device is used for programming locks and keys; access data is defined by a computer interface and stored to a data base. These systems are widely used in industrial locking systems, schools, hospitals and rental apartment houses, for example. This kind of systems are too complex for private customers having typically 5 locks in a house, 4 keys for the family members and 1 key for a cleaner.

BRIEF DESCRIPTION

According to another aspect of the present invention, there is provided an electromechanical lock comprising a user interface configured to receive input from a user, the user interface activating operating power for the lock; a memory configured to store access tables, the access tables comprising information on the keys allowed to open the lock; and an electronic circuitry configured to modify the access tables on the basis of the insertions of an associated master key and an end function key into the lock, the insertion of the associated master key initializing a programming mode and the insertion of an end function key causing the lock to exit the programming mode.

According to yet another aspect of the present invention, there is provided a method in an electromechanical lock comprising: storing access tables in a memory, the access tables comprising information on the keys allowed to open the lock; and modifying the access tables on the basis of the insertions of an associated master key and an end function key into the lock, the insertion of the associated master key initializing a programming mode and the insertion of an end function key causing the lock to exit the programming mode.

According to yet another aspect of the present invention, there is provided an electromechanical lock comprising means for receiving input from a user and activating operating power for the lock; means for storing access tables; the access tables comprising information on the keys allowed to open the lock; and means for modifying the access tables on the basis of the insertions of an associated master key and an end function key into the lock, the insertion of the associated master key initializing a programming mode and the insertion of an end function key causing the lock to exit the programming mode.

The invention has several advantages. All functions related to access rights of a self-powered lock may be easily managed with the proposed solution. There is no need for a separate programming device or a computer interface or access data storing in a computer system.

LIST OF DRAWINGS

Embodiments of the present invention are described below, by way of example only, with reference to the accompanying drawings, in which FIG. 1A illustrates an example of the structure of an electromechanical lock;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1A:
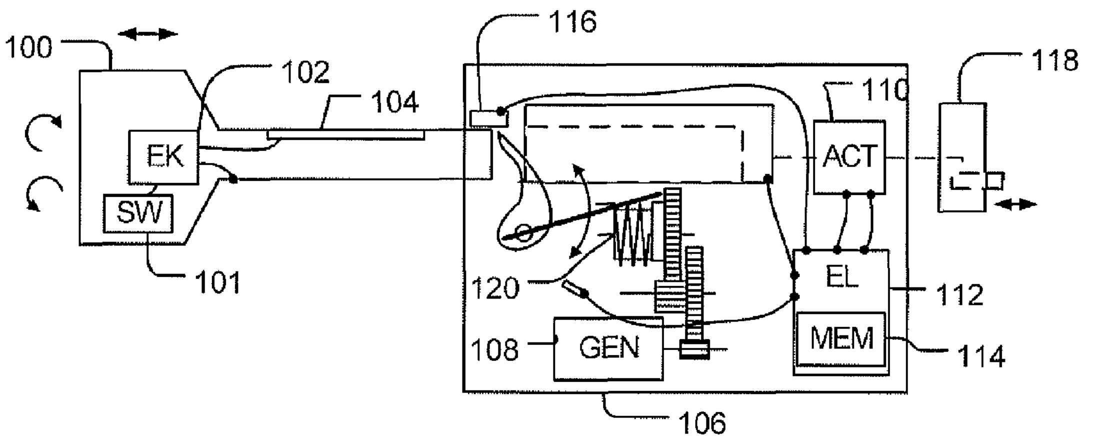
FIG. 1B illustrates an embodiment of a self-powered electronic locking system.

With reference to FIG. 1A, an example of the structure of an electromechanical lock 106 is explained. The lock 106 comprises an electronic circuit 112 configured to read access data from an external source 100, and match the data against a predetermined criterion. The electronic circuit 112 may be implemented as one or more integrated circuits, such as application-specific integrated circuits ASICs. Other embodiments are also feasible, such as a circuit built of separate logic components, or a processor with its software. A hybrid of these different embodiments is also feasible. When selecting the method of implementation, a person skilled in the art will consider the requirements set on the power consumption of the device, production costs, and production volumes, for example. The electronic circuit 112 may comprise a memory 114. The memory may also be realised with a memory unit separate to the electronic circuit as one skilled in the art is well aware.

The external source 100 may be an electronic circuit configured to store the data. The electronic circuit may be an iButton® (www.ibutton.com) of Maxim Integrated Products, for example; such an electronic circuit may be read with 1-Wire® protocol. The electronic circuit may be placed in a key or a token, for example, but it may be positioned also in another suitable device or object. The only requirement is that the electronic circuit 112 may read the data from the electronic circuit. The data transfer from the electronic circuit to the electronic circuit 112 may be performed with any suitable wired or wireless communication technique. In user-powered locks, produced energy amount may limit the used techniques. Magnetic stripe technology or smart card technology may also be used as the external source. Wireless technologies may include RFID (Radio-frequency identification) technology, or mobile phone technology, for example. The external source may be a transponder, an RF tag, Near Field Communication (NFC) device or any other suitable memory type capable of storing data.

The unique key data may be copy protected by using crypted authentication technologies by matching the key data against predetermined criterion of the lock data. The authentication may be performed with SHA-1 (Secure Hash Algorithm) function, designed by the National Security Agency (NSA). In SHA-1, a condensed digital representation (known as a message digest) is computed from a given input data sequence (known as the message). The message digest is to a high degree of probability unique for the message. Naturally, any suitable authentication technique may be used to authenticate the data read from the external source. The selection of the authentication technique depends on the desired security level of the lock 106 and possibly also on the permitted consumption of electricity for the authentication (especially in user-powered electromechanical locks).

FIG. 1A shows an external source such as a key 100 comprising an electronic circuit 102 connected to a contact arrangement 104 and a key frame. The electromechanical lock 106 of FIG. 1A is a user-powered lock. The lock 106 comprises power transmission mechanics 120 which transforms mechanic energy from a user to an electric generator 108 powering the electronic circuit 112 when the key 100 is inserted into the lock 106. In this example, the electronic circuit 112 is configured to communicate with the electronic circuit 102 of the key through a contact arrangement 116 and the contact arrangement 104 of the key. The communication may be realized as a wireless connection or by physical conductivity. The key may act as a user interface of the lock or the lock may comprise a door knob or a respective element. The operating of the user interface of the lock comprises turning a doorknob or inserting a physical key into the lock. The operation activates the lock and provides operating power for the lock to perform the authentication.

The electronic circuit 112 is configured to read access data from the electronic circuit 102 of the key 100 upon the key insertion.

The lock of FIG. 1A further comprises an actuator 110 configured to receive the open command, and to set the lock in a mechanically openable state. The actuator may be powered by the electric power produced with the generator 108. The actuator 110 may be set to the locked state mechanically, but a detailed discussion thereon is not necessary to illuminate the present embodiments.

When the actuator 110 has set the lock in a mechanically openable state a lock bolt of a bolt mechanism 118 can be moved by rotating the key 100, for example. The mechanical power required may also be produced by the user by turning a handle or a knob of a door (not shown in FIG. 1A). Other suitable turning mechanisms may be used as well.

The electronic circuit 112 may be configured to provide a signal for the key 100 if the open command is not issued because the data does not match the predetermined criterion, so that the key 100 may inform the user that the data did not match the predetermined criterion. As a further improvement, the electronic circuit 112 may be configured to provide electric power for the key 100. An advantage of this is that the key 100 may inform the user with the electric power received from the electronic circuit 112. The key 112 may inform the user with a visual or an audio indicator, for example.

Each external source or key comprises unique access data which identifies the source or the key. A lock may be programmed to open with only a given set of keys. In an embodiment, a lock is configured to store access tables comprising key access data in a memory. The access tables comprise information on the keys allowed to open the lock. Keys that are not included in the access table do not open the lock.

In an embodiment, the access tables of a lock may be modified on the basis of the insertions of a specified set of keys called a master key and an end function key into the lock.

Figure 1B:
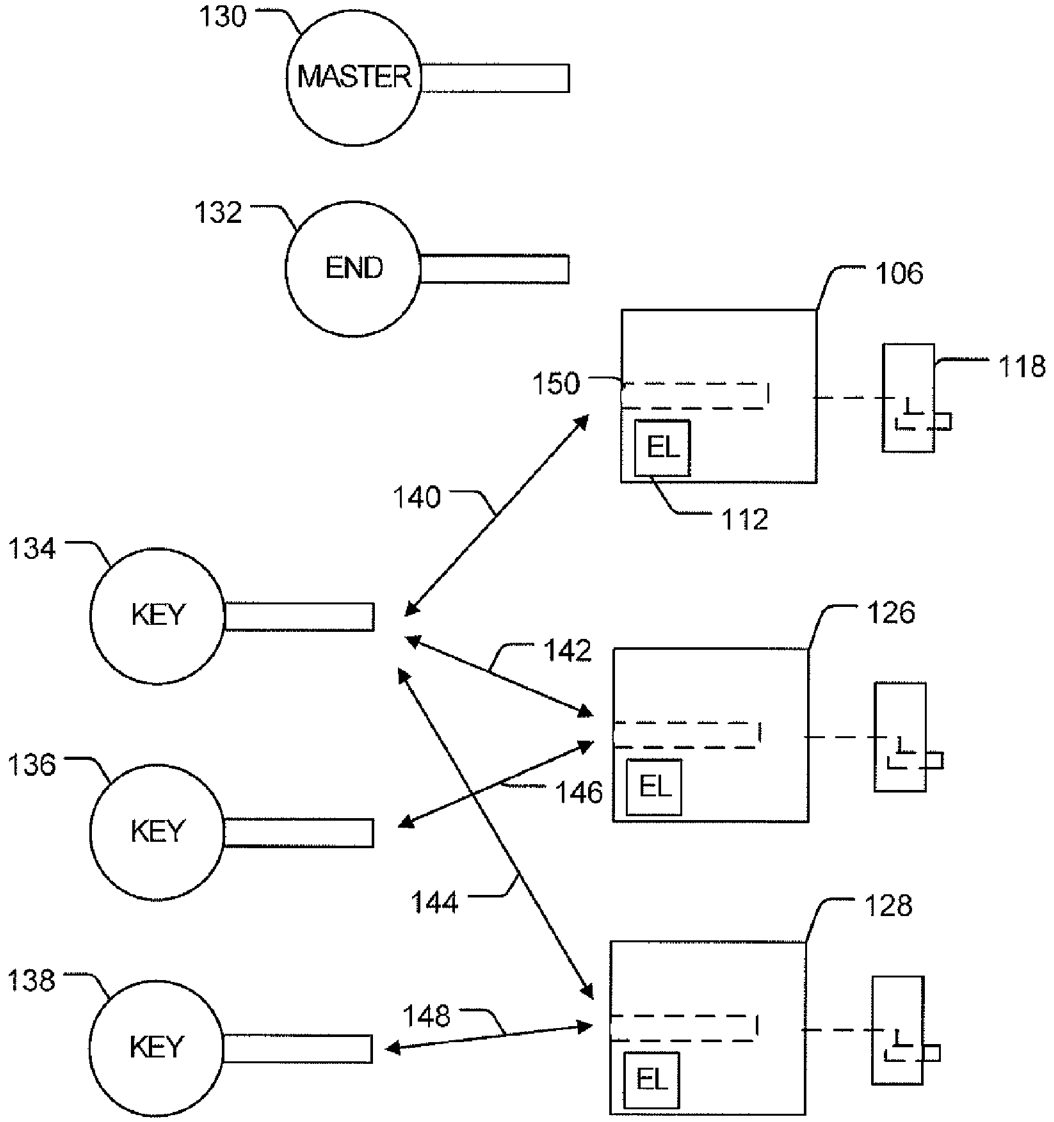

With reference to FIG. 1B a main components and a key access of the locking system is explained, as an example. In this example, a locking system comprises three locks 106, 126 and 128. The locking system may utilize a master key 130 and an end function key 132 which are used for managing keys 134, 136 and 138 and the access rights of each key. In this example, key 134 has access 140, 142, 144 to locks 124, 126 and 128. Key 136 has access 146 to lock 146 and key 138 has access 148 to lock 148.

When a key is inserted to the keyway 150 of the lock 106, for example, the lock is configured to generate electric power from the insertion and power up. The electronic circuitry 112 is configured to detect the insertion of the key and send a query or a challenge to the key. The key responds to the query. The lock is configured to detect the access data sent by the key. If the inserted key is a master key, the lock is configured to enter a programming state. If the key is not a master key, a key authorization process is started. In case the inserted key is allowed to open the lock, the lock 106 is set to an openable state and a lock bolt of a bolt mechanism 118 is moved by turning the key. If the key is not allowed to open the lock, the lock remains in a locked state. The key accesses may be stored in a memory of the lock.

In an initial or factory state, each lock is blank. The access list stored in the memory of the lock does not contain any key access data. A factory state lock is not associated with any master key. In an embodiment, all keys are capable of opening a blank lock. In another embodiment, the lock does not open with any key. Blank access data in a factory state lock enables efficient manufacturing and logistics processes.

However, each factory state lock is programmed to recognize a set of a specified set of keys called master keys and end function keys. Each master key has a unique access data stored in the key. Master keys and end function keys are used only in the programming of a lock. These keys do not open a programmed lock. In an embodiment, each end function key has the same access data stored in the key. However, each end function key may also have a unique access data. In an embodiment, a master key is used to start a lock programming sequence. The end function key is used to end the programming sequence.

In an embodiment, the end key function is performed when the lock recognizes the end key data read from the end function key. Referring to FIG. 1A, the end key data may be produced also from a master key 100 provided with an end function button or switch 101. In this case, the master key sends the end function data if the end button or switch is activated when the key is inserted into a lock.

Thus, in an embodiment, a key comprises an electronic circuit 102 configured to store at least two different sets of key access data, such as master key data and end key data. The key further comprises a switch or a button configured to select one of the stored key access data sets as an active set.

In the following examples separate master and end keys are used but a single master key with an end button or switch may be used as well.

Figure 2:
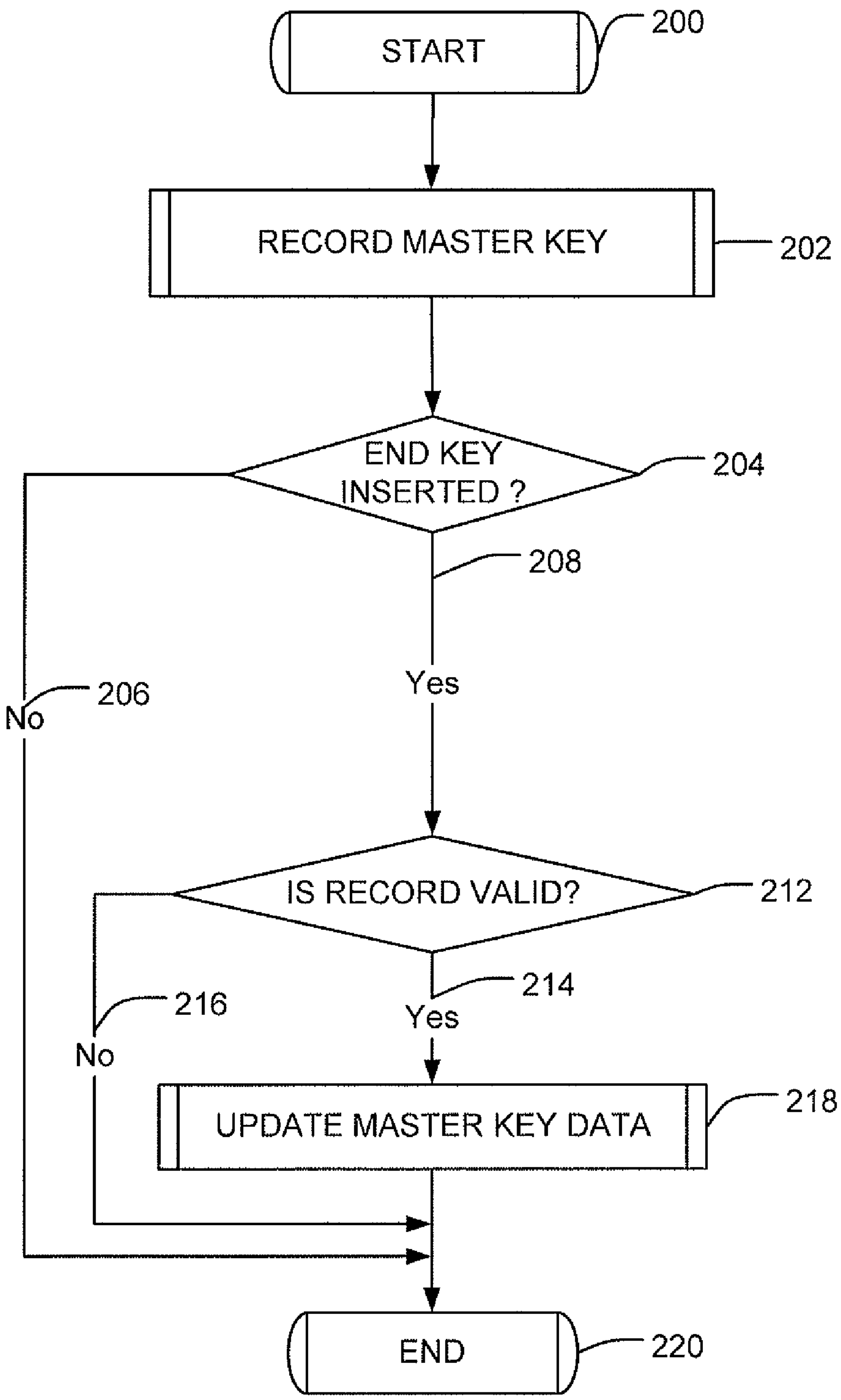
FIGS. 2, 3 and 4 are flowcharts illustrating embodiments.

With reference to the flow chart of FIG. 2, an example of the lock initialization or the first programming is explained. The method starts in 200. At this phase, the lock is at factory state and the access list stored in the memory of the lock does not comprise any access data. As the lock is self-powered, the lock is powered down when no keys are inserted and the user interface of the lock is not operated. The lock powers up only when the user interface of the lock is operated by a user by inserting a key into the lock, for example. In the lock initialization, a master key is associated with the lock. The associated master key may then be used in the programming of the lock. The associated master key is used when normal keys are added to or removed from the access list stored in the lock memory.

In step 202, a master key in inserted into the lock. In this example, electric power is produced on the basis of the movement of the key. The generated electricity powers up the lock. The electronic circuitry of the lock wakes up and reads the access data of the key. The access data may be read by sending a query to the key which responds with a reply. The electronic circuitry is configured to detect that the inserted key a master key. The master key data is stored to the lock memory as a key data item. In an embodiment, the insertion of a master key causes the electronic circuitry of the lock to enter a programming mode. After that the electric power runs out and the lock is "dead", i.e. it powers down.

In step 204, a second key is inserted into the lock. The lock powers up again and queries the key access data from the key. As the electronic circuitry of the lock is in the programming mode, it is aware that the inserted key is not intended to open the lock. If the electronic circuitry recognizes the key is as an end function key, the end key access data is stored in a memory and the process continues 208. If any other key is inserted the process is cancelled in 206. As the lock is in a factory state and a master key has not yet been registered with the lock it will not accept any other keys to the access list at this point. In an embodiment, the insertion of an end function key causes the electronic circuitry of the lock to exit the programming mode.

In step 212, the lock has detected that an end function key has been inserted into the lock. The lock operates on the electricity generated when the end function key was inserted. The electronic circuitry performs a validation check for the data recorded in steps 202 and 204. In this case of initial programming, a sequence is valid if it comprises master key data and end key data. The process continues 214 if the data is valid and aborts 216 if not valid In step 218, the electronic circuitry stored the master key data in the access memory. The master key inserted in step 202 is now associated with the lock.

In step 220, the process ends.

At this phase, the lock access rights can be managed by the associated master key. However, as normal keys have not yet been added into the access list of the lock the lock can't be opened.

In an embodiment, a master key is used to start a lock programming sequence. The end function key is used to end the programming sequence. In an embodiment, the number of times the master key is inserted successively into the lock may be used to determine the desired operation. Thus, if a master key is inserted X1 times into the lock successively, where X1 is a positive integer, new keys may be added to the access list stored in the lock. If a master key is inserted X2 times into the lock successively, where X2 is a positive integer but different from X1, keys may be removed from the access list stored in the lock.

In the above-mentioned procedures, individual keys are added to or erased from the access list stored in the memory of a lock. In some cases it may be advantageous to erase the whole access data list of a lock or return the lock into the factory state, for example. The number of times the master key is inserted successively into the lock may be used to denote also these operations. Thus, if a master key is inserted Y1 times into the lock successively, where Y1 is a positive integer but different from X1 and X2, the access list is erased. If a master key is inserted Y2 times into the lock successively, where Y2 is a positive integer but different from X1, X2, and Y1, the lock is returned to a factory state. In the factory state, the lock is not associated to any master key and the procedure described in connection with FIG. 2 should be performed in order to add keys to the access list of the lock.

Figure 3:
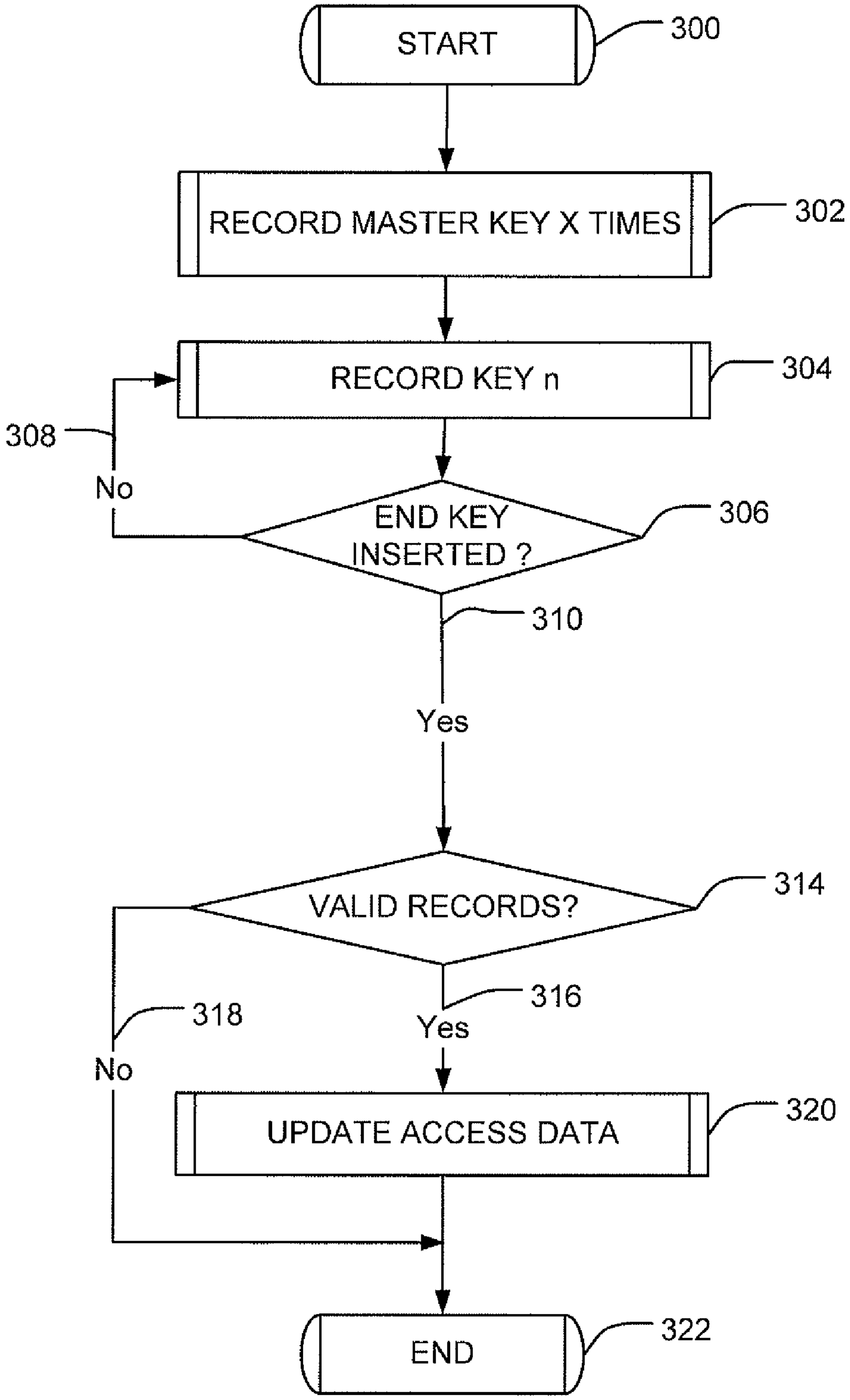

An example of adding and removing keys to and from the access list is illustrated in the flowchart of FIG. 3. The method starts in step 300.

In step 302, the master key associated with the lock in inserted successively X times into the lock. Each time a master key is inserted into the lock, the lock powers up, the electronic circuitry detects the access data from the key and stores the access data as a key data item into the memory of the lock, and the lock powers down. The first insertion of the master key initiates the programming mode of the lock.

In this example, new keys are added to the access list if the master key is inserted once in step 302, and the keys are removed from the access list if the master key is inserted successively two times in step 302. Thus, in this example X1 equals to one and X2 equals to two. These numerical values are merely nonlimiting examples of possible values.

In steps 304 and 306, keys are inserted and recorded to the lock memory. Each time a key is inserted into the lock, the lock powers up, the electronic circuitry detects the access data from the key and stores the access data as a key data item into the memory of the lock.

In step 306 the electronic circuitry determines whether an end function key has been inserted. If not 308, the lock powers down and the process continues in step 304.

If an end function key is detected in step 306, the lock does not power down and the process continues 310.

In step 314, the electronic circuitry performs a validation check for the data recorded in steps 302 and 304. The electronic circuitry is configured to determine that the data recorded form a valid operation sequence. An operation sequence is valid if the stored key data items comprise a predetermined number of master key data items and N key data items where N an integer equal to or greater than zero and the last key data item is end key data. In this case, the sequence comprises either X1 or X2 master key items, a given number of key items and the end key item. The lock powers down and process aborts 318 if the validation check fails. The lock does not power down and the process continues 316 if the data is valid.

In step 320, the electronic circuitry of the lock updates the access list of the lock on the basis of the operation sequence. The access list is updated with the access data of the inserted keys if the master key was inserted once in step 302. The access data of the inserted keys is removed from the access list if the master key was inserted two times in step 302.

In step 322, the process ends.

Figure 4:
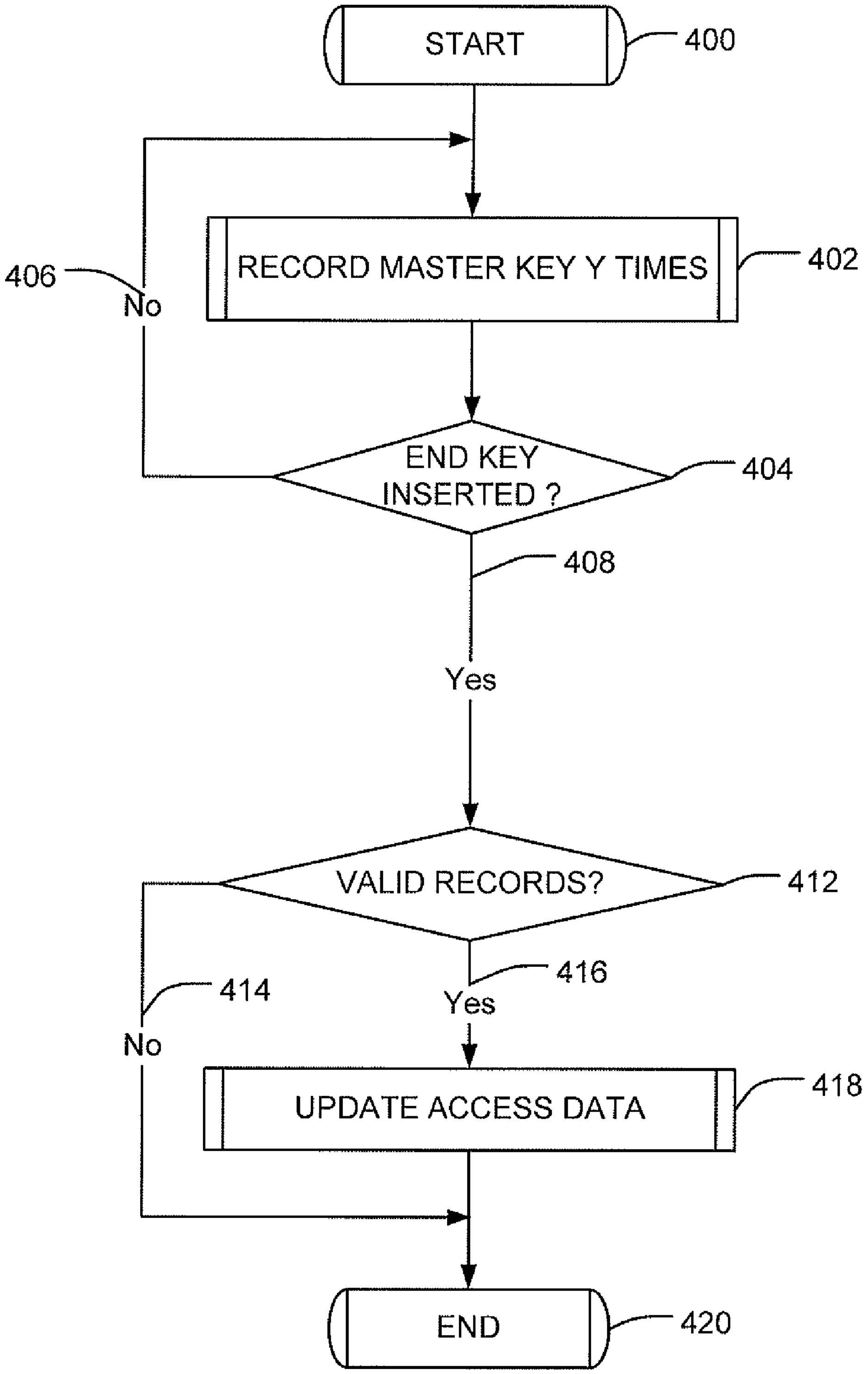

In the example of FIG. 3, individual keys were added to or erased from the access list stored in the memory of a lock. FIG. 4 illustrates an example of a procedure where the access data list of a lock is erased or the lock is returned to the factory state. This process is advantageous in cases where a lost key should be erased from the access data, for example.

As described above, a master key may be used to start a lock programming sequence. The number of times the master key is inserted successively inserted into the lock may be used to determine the desired operation.

The method starts in 400.

In steps 402 and 404, the master key associated with the lock in inserted successively Y times into the lock. Each time a master key is inserted into the lock, the lock powers up, the electronic circuitry detects the access data from the key and stores the access data as a key data item into the memory of the lock, and the lock powers down. The first insertion of the master key initiates the programming mode of the lock.

In this example, the access data list of a lock is erased if the master key is successively inserted five times in step 402, and the lock is set to the factory state if the master key is inserted successively eight times in step 402. Thus, in this example Y1 equals to five and Y2 equals to eight. These numerical values are merely nonlimiting examples of possible values.

In step 404 the electronic circuitry determines whether an end function key has been inserted. If not 406, the lock powers down and the process continues in step 402.

If an end function key is detected in step 404, the lock does not power down and the process continues 408.

In step 412, the electronic circuitry performs a validation check for the data recorded in steps 402 and 404. The electronic circuitry is configured to determine that the data recorded form a valid operation sequence. An operation sequence is valid if the stored key data items comprise a predetermined number of master key data items and the last key data item is end key data. In this case, the sequence comprises either Y1 or Y2 master key items and the end key item. The lock powers down and process aborts 414 if the validation check fails. The lock does not power down and the process continues 416 if the data is valid.

In step 418, the access data list is erased if the master key was inserted 5 times in step 402 and the lock is set to the initial state if the master key was inserted eight times.

In step 420, the process ends.

Figure 5:
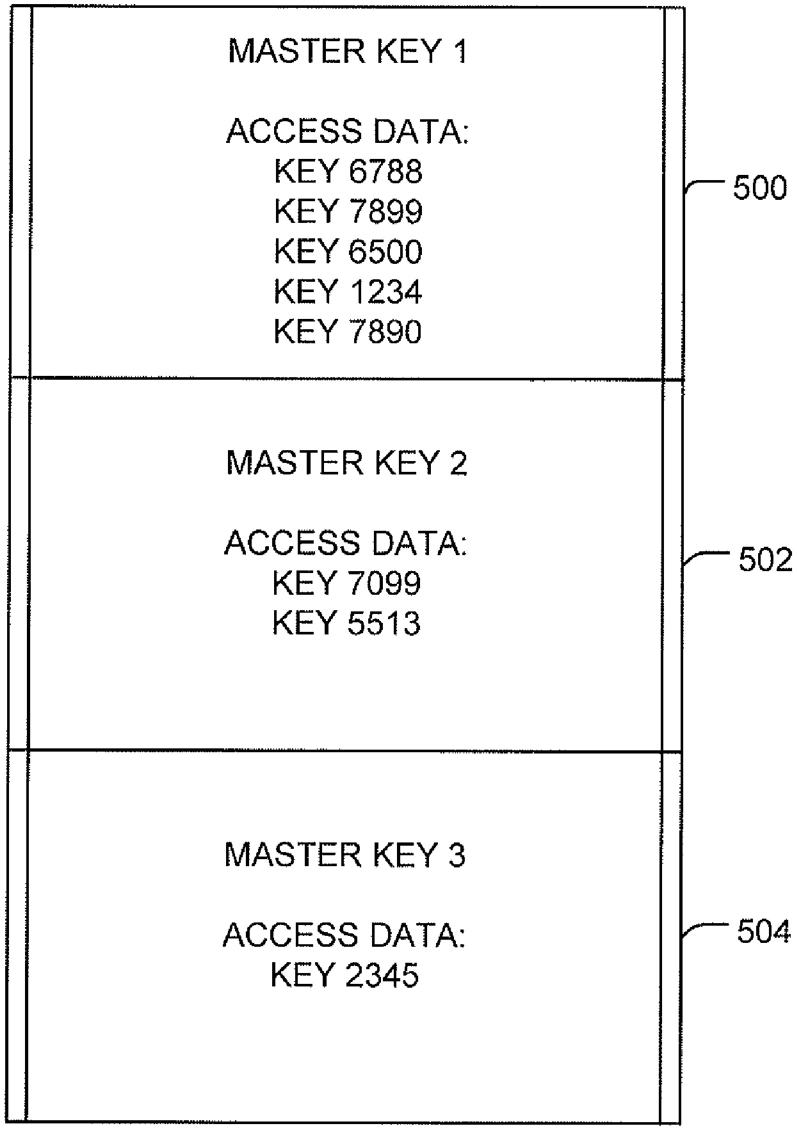
FIG. 5 illustrates the access data memory of a lock.

With reference to FIG. 5, the access data memory of the lock is illustrated. Referring to FIG. 1A, the lock comprises a memory 114 either as a part of the electronic circuitry 112 or as a separate memory. The memory is configured to store various data required in the operation of the lock. The data may include the access list comprising information on the keys allowed to open the lock, the key data items entered during programming phase, the key data of the associated master key, for example. The example of FIG. 5 illustrates the structure of the access list. The access list stored in the lock memory may comprise different access groups under the group specified master keys.

In an embodiment, more than one master key may be associated with a lock. One of the master keys may be the principal master keys and other keys may be sub master keys. However, multiple master keys are not required to create access groups. Access groups may be created by successively inserting the master key into the lock. Also different number of combinations of different level master keys may be provided.

In the example of FIG. 5, the access list of a lock comprises three access groups, 500, 502 and 504. The access group 500 comprises five keys with given access data. The access group is associated with a master key 1. The access group 502 comprises two keys with given access data. The access group is associated with a master key 2. The access group 504 comprises one key with given access data. The access group is associated with a master key 3.

The master keys 1, 2 and 3 may be separate keys. The access groups may also be managed with a single master key. For example, the group 500 may be managed by inserting the master key once for adding keys, twice for removing keys and three times for emptying the access group.

The group 502 may be managed by inserting the master key five times for adding keys, six times removing keys and seven times for emptying the access group.

The group 504 may be managed by inserting the master key nine times for adding keys, ten times removing keys and eleven times for emptying the access group.

Thus, in an embodiment, the lock is configured to respond to the successive insertions of a master key according to the following table:

| # of insertions | Procedure |
|---|---|
| 1 | Add keys to access group 500 |
| 2 | Remove keys from access group 500 |
| 3 | Empty access group 500 |
| 5 | Add keys to access group 502 |
| 6 | Remove keys from access group 502 |
| 7 | Empty access group 502 |
| 9 | Add keys to access group 504 |
| 10 | Remove keys from access group 504 |
| 11 | Empty access group 504 |
| 15 | Empty all access groups |
| 18 | Return to factory state |

It will be obvious to a person skilled in the art that, as technology advances, the inventive concept can be implemented in various ways. The invention and its embodiments are not limited to the examples described above but may vary within the scope of the claims.

The invention claimed is:

1. An electromechanical lock comprising a generator configured to generate operating power upon the insertion of a key into the lock;

a memory configured to store access tables, the access tables comprising information on the keys allowed to open the lock; and an electronic circuitry configured to detect one or more insertions of an associated master key, the insertion of the associated master key initializing a programming mode, store key data of each inserted key into the memory, power down the lock between each insertion of a key;

detect the insertions of one or more keys, store key data of each inserted key into the memory, power down the lock between each insertion of a key;

and detect the insertion an end function key into the lock, the insertion of the end function key causing the electronic circuitry to read key data from the memory, update the access tables on the basis of the read key data, and cause the lock to exit the programming mode, and power down the lock, wherein the electronic circuitry is configured to determine the access table update depending on the number of master key data items stored in the memory.

2. The electromechanical lock of claim 1, wherein a factory state lock is not associated with any master key.

3. The electromechanical lock of claim 2, wherein the electronic circuitry of a factory state lock is configured to detect the insertion of a master key, detect the insertion of an end function key, associate the inserted master key with the lock to modify the access tables and to control further master key associations.

4. The electromechanical lock of claim 1, wherein when in programming mode, the electronic circuitry is configured to detect the insertion of a key, store the key data in a memory as a key data item, and power down the lock.

5. The electromechanical lock of claim 4, wherein the lock is configured power up and detect the insertion of a key, and the electronic circuitry is configured to detect that the inserted key is an end function key, read stored key data items from a memory, and execute the operation sequence.

6. The electromechanical lock of claim 5, wherein the electronic circuitry is configured to determine the validity of the master key, the end function key, and the keys prior executing the sequence.

7. The electromechanical lock of claim 4, wherein the operation sequence adds a key to the access table, removes a key from the access table, empties the access table or sets the lock in a factory state.

8. A method in an electromechanical lock comprising:

storing access tables in a memory, the access tables comprising information on the keys allowed to open the lock;

generating operating power upon the insertion of a key into the lock; and detecting one or more insertions of an associated master key, the insertion of the associated master key initializing a programming mode, storing key data of each inserted key into the memory, powering down the lock between each insertion of a key;

detecting the insertions of one or more keys, storing key data of each inserted key into the memory, powering down the lock between each insertion of a key;

and detecting the insertion an end function key into the lock, the insertion of the end function key causing the electronic circuitry to read key data from the memory, update the access tables on the basis of the read key data, and cause the lock to exit the programming mode, and power down the lock, wherein the access table update is determined depending on the number of master key data items stored in the memory.

9. The method of claim 8, comprising, when not associated with any master key:

detecting the insertion of a master key, detecting the insertion of an end function key, associating the inserted master key with the lock to modify the access tables and to control further master key associations.

10. The method of claim 8, comprising when in programming mode:

detecting the insertion of a key, detecting the key data of the inserted key, storing the key data in a memory as a key data item, and powering down the lock.

11. The method of claim 8, comprising:

detecting the insertion of a key, detecting that the inserted key is an end function key, reading stored key data items from a memory, and executing the operation sequence.

12. The method of claim 11, wherein the operation sequence adds a key to the access table, removes a key from the access table, empties the access table or sets the lock in a factory state.

13. A non-transitory computer-readable medium containing a computer program comprising computer-executable instructions adapted to perform, when the program is run on a processor, the following:

storing access tables in a memory, the access tables comprising information on the keys allowed to open the lock;

generating operating power upon the insertion of a key into the lock; and detecting one or more insertions of an associated master key, the insertion of the associated master key initializing a programming mode, storing key data of each inserted key into the memory, powering down the lock between each insertion of a key;

detecting the insertions of one or more keys, storing key data of each inserted key into the memory, powering down the lock between each insertion of a key;

and detecting the insertion an end function key into the lock, the insertion of the end function key causing the electronic circuitry to read key data from the memory, update the access tables on the basis of the read key data and cause the lock to exit the programming mode, and power down the lock, wherein the access table update is determined depending on the number of master key data items stored in the memory.

14. An electromechanical lock comprising means for generating operating power upon the insertion of a key into the lock;

means for detecting one or more insertions of an associated master key, the insertion of the associated master key initializing a programming mode, storing key data of each inserted key into the memory, powering down the lock between each insertion of a key;

means for detecting the insertions of one or more keys, storing key data of each inserted key into the memory, powering down the lock between each insertion of a key; and means for detecting the insertion an end function key into the lock, the insertion of the end function key causing the means to read key data from the memory, update the access tables on the basis of the read key data, and cause the lock to exit the programming mode, and power down the lock, wherein the access table update is determined depending on the number of master key data items stored in the memory.

* * * * *